(12) United States Patent
Hotta et al.

(10) Patent No.: US 10,690,044 B2
(45) Date of Patent: Jun. 23, 2020

(54) ENGINE SYSTEM (71) Applicant: MITSUBISHI HEAVY INDUSTRIES, LTD., Tokyo (JP)

(72) Inventors: Kazuro Hotta, Tokyo (JP); Yuta Furukawa, Tokyo (JP); Kazuo Ogura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 162 days.

(21) Appl. No.: 15/541,888

(22) PCT Filed: Jan. 12, 2016

(86) PCT No.: PCT/JP2016/050685
§ 371 (c)(1),
(2) Date: Jul. 6, 2017

(87) PCT Pub. No.: WO2016/111375
PCT Pub. Date: Jul. 14, 2016

(65) Prior Publication Data
US 2018/0023458 A1  Jan. 25, 2018

(30) Foreign Application Priority Data

Jan. 9, 2015 (JP) ................................ 2015-003072

(51) Int. Cl.
*F02B 37/013* (2006.01)
*F02B 37/007* (2006.01)
*F02B 37/00* (2006.01)

(52) U.S. Cl.
CPC .......... *F02B 37/013* (2013.01); *F02B 37/001* (2013.01); *F02B 37/004* (2013.01); *F02B 37/007* (2013.01); *Y02T 10/144* (2013.01)

(58) Field of Classification Search
CPC .... F02B 37/013; F02B 37/001; F02B 37/004; F02B 37/007
(Continued)

(56) References Cited

U.S. PATENT DOCUMENTS 2,303,949 A * 12/1942 Nordell ................. F16L 43/001
138/39
2,780,053 A   2/1957 Cowland
(Continued)

FOREIGN PATENT DOCUMENTS

JP   55109726 A  *  8/1980  ............ F02B 37/013
JP   08105088 A  *  4/1996
(Continued)

OTHER PUBLICATIONS

International Search Report and Written Opinion of the International Searching Authority (Forms PCT/ISA/237 and PCT/ISA/210), dated Mar. 29, 2016, for International Application No. PCT/JP2016/050685, with an English translation.

*Primary Examiner* — Thai Ba Trieu
(74) *Attorney, Agent, or Firm* — Birch, Stewart, Kolasch & Birch, LLP.

(57) ABSTRACT

A engine system is provided with: a plurality of cylinder groups which burn a gas mixture and discharge an exhaust gas; a plurality of high-pressure stage superchargers each having high-pressure stage turbines driven by the exhaust gas from the corresponding cylinder group and high-pressure stage compressors rotated by driving of the high-pressure stage turbines and configured to compress a gas supplied to the corresponding cylinder group; and a plurality of low-pressure stage superchargers having a low-pressure stage turbine driven by an exhaust gas discharged from the high-pressure stage turbine of the high-pressure supercharger which is any one of the plurality of high-pressure stage superchargers, and a low-pressure stage compressor (Continued)

rotated by driving of the low-pressure stage turbine and configured to compress a gas supplied to the high-pressure stage compressor of the high-pressure stage supercharger other than the one high-pressure stage supercharger.

2 Claims, 4 Drawing Sheets

(58) Field of Classification Search
USPC .............................................. 60/612; 123/562
See application file for complete search history.

(56) References Cited

U.S. PATENT DOCUMENTS

| | | | | |
|---|---|---|---|---|
| 2,986,327 A * | 5/1961 | Hunter | ................ | F04D 27/0207 415/11 |
| 3,910,715 A * | 10/1975 | Yedidiah | ............. | F04D 29/2277 138/39 |
| 4,638,634 A * | 1/1987 | McLean | ................ | F02B 37/007 60/612 |
| 4,685,942 A * | 8/1987 | Klassen | ................. | F02C 7/052 60/39.092 |
| 5,692,378 A * | 12/1997 | Ramsden | ............. | F02B 37/013 60/612 |
| 6,520,738 B2 * | 2/2003 | Sheoran | .................... | F15D 1/04 415/205 |
| 6,672,062 B2 * | 1/2004 | Shaffer | ................ | F02B 37/013 60/612 |
| 7,165,403 B2 * | 1/2007 | Sun | ....................... | F02B 37/013 60/612 |
| 8,449,250 B2 * | 5/2013 | Anschel | .................. | F02B 37/00 415/206 |
| 2002/0056444 A1 | 5/2002 | Chou et al. | | |
| 2007/0036662 A1 * | 2/2007 | Pesola | .................... | F04D 17/12 417/350 |
| 2008/0163624 A1 * | 7/2008 | Augustinson | ........ | F02B 37/013 138/177 |
| 2010/0061843 A1 * | 3/2010 | Anderson | ............. | F02B 37/004 415/183 |
| 2013/0283788 A1 * | 10/2013 | Kobayashi | ............. | F02M 26/06 60/605.2 |
| 2014/0260239 A1 | 9/2014 | Genter | | |
| 2015/0050136 A1 * | 2/2015 | Tomita | ............ | F02M 35/10124 415/206 |
| 2015/0337780 A1 * | 11/2015 | Kanzaka | ................. | F02B 37/00 415/203 |
| 2018/0016968 A1 * | 1/2018 | Ablinger | ............... | F02B 37/013 |
| 2018/0274831 A1 * | 9/2018 | Iancu | ...................... | F25B 41/06 |
| 2019/0032833 A1 * | 1/2019 | Nakaniwa | ............. | F04D 29/441 |

FOREIGN PATENT DOCUMENTS

| | | |
|---|---|---|
| JP | 2002-115556 A | 4/2002 |
| JP | 4295904 B2 | 7/2009 |
| JP | 2009-250068 A | 10/2009 |
| JP | 2010-281281 A | 12/2010 |
| SU | 1361365 A1 * | 12/1987 ............ F02M 25/035 |
| WO | WO 2012/123629 A1 | 9/2012 |
| WO | WO-2016139009 A1 * | 9/2016 ............ F02B 37/013 |

* cited by examiner

ENGINE SYSTEM

TECHNICAL FIELD

The present invention relates to an engine system including a plurality of cylinder groups and a supercharger which compresses a gas supplied to the cylinder groups.

Priority is claimed on Japanese Patent Application No. 2015-003072, filed Jan. 9, 2015, the content of which is incorporated herein by reference.

BACKGROUND ART

Conventionally, in an internal combustion engine such as a gas engine including a large number of cylinders, for the purpose of achieving high output and low fuel consumption, one having a plurality of exhaust turbine type superchargers such as a two-stage (multistage) supercharging system has been proposed (for example, see Patent Document 1).

CITATION LIST

Patent Literature

[Patent Literature 1]
  Japanese Patent No. 4295904

SUMMARY OF INVENTION

Technical Problem

In an engine including a large number of cylinders, it is difficult to make combustion uniform while equalizing the mass and flow velocity of a gas mixture being supplied to each cylinder. Thus, a temperature and flow rate of an exhaust gas discharged from each cylinder may be different.

The engine described in Patent Document 1 is a V-type engine having two cylinder groups (banks). The exhaust gas discharged from each cylinder group is connected to different superchargers. When the temperature and the flow rate of the exhaust gas discharged from each cylinder group are different, since the temperature and the flow rate of the gas being introduced into the turbine of each supercharger are different, the turbine outputs differ respectively. Therefore, a task of compressing the gas mixture with a compressor of the superchargers is also different.

As described above, when the temperature and the flow rate of the exhaust gas introduced into each supercharger are different, the supercharger operates off a planned operating point. Thus, there is a possibility that the efficiency may be degraded or there may be operation beyond a surge line of the supercharger.

The present invention provides an engine system capable of making the air-intake flow rate and the pressure ratio between cylinder groups close to being equal to each other even when exhaust energies of the exhaust gases discharged from a plurality of cylinder groups are different from each other.

Solution to Problem

According to a first aspect of the present invention, an engine system includes a plurality of cylinder groups which burn a supplied gas mixture and discharge an exhaust gas, a plurality of high-pressure stage superchargers each having a high-pressure stage turbine driven by the exhaust gas of the corresponding cylinder group and a high-pressure stage compressor rotated by driving of the high-pressure stage turbine and configured to compress a gas supplied to the corresponding cylinder group, and a plurality of low-pressure stage superchargers each having a low-pressure stage turbine driven by an exhaust gas discharged from the high-pressure stage turbine of any one high-pressure stage supercharger of the plurality of high-pressure stage superchargers and a low-pressure stage compressor rotated by driving of the low-pressure stage turbine and configured to compress a gas supplied to a high-pressure stage compressor of a high-pressure stage supercharger other than the one high-pressure stage supercharger.

According to such a configuration, it is possible to make the air-supply flow rate and the pressure ratio between the cylinder groups close to being equal to each other even when exhaust energies of the exhaust gases discharged from the plurality of cylinder groups are different from each other.

According to a second aspect of the present invention, an engine system includes a first cylinder group and a second cylinder group which burn a supplied gas mixture and discharge an exhaust gas, a first high-pressure stage supercharger and a second high-pressure stage supercharger each having a high-pressure stage turbine driven by the exhaust gas of the corresponding cylinder group and a high-pressure stage compressor rotated by driving of the high-pressure stage turbine and configured to compress a gas supplied to the corresponding cylinder group, a first low-pressure stage supercharger having a first low-pressure stage turbine driven by an exhaust gas discharged from the high-pressure stage turbine of the first high-pressure stage supercharger and a first low-pressure stage compressor rotated by driving of the first low-pressure stage turbine and configured to compress a gas supplied to the high-pressure stage compressor of the second high-pressure stage supercharger, and a second low-pressure stage supercharger having a second low-pressure stage turbine driven by an exhaust gas discharged from the high-pressure stage turbine of the second high-pressure stage supercharger and a second low-pressure stage compressor rotated by driving of the second low-pressure stage turbine and configured to compress a gas supplied to the high-pressure stage compressor of the first high-pressure stage supercharger.

In the above-described engine system, a pipe connecting the low-pressure stage compressor to the high-pressure stage compressor may be formed so that the gas introduced into the high-pressure stage compressor swirls in a rotational direction of the high-pressure stage compressor.

According to such a configuration, since the rotational direction of the compressor and the flowing direction of the gas coincide, it is possible to form a gas flow introduced into the compressor without increasing a pressure loss. As a result, it is possible to operate the compressor in a state in which the operation efficiency is high.

Advantageous Effects of the Invention

According to the engine system described above, it is possible to make the air-supply flow rate and the pressure ratio between the cylinder groups substantially equal to each other even when exhaust energies of the exhaust gases discharged from a plurality of cylinder groups are different from each other.

DESCRIPTION OF EMBODIMENTS

Hereinafter, an engine system 1 according to an embodiment of the present invention will be described in detail with reference to the drawings.

Figure 1:
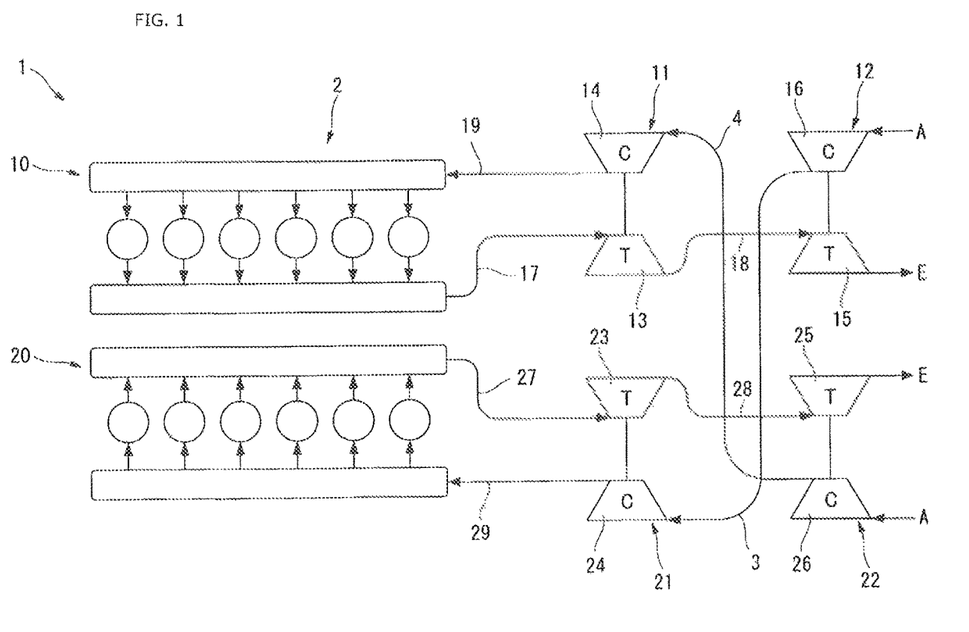
FIG. 1 is a view schematically illustrating a configuration example of an engine system according to an embodiment of the present invention.

As illustrated in FIG. 1, the engine system 1 of the present embodiment is a system including a two-stage (a multistage) supercharging system in which an engine main body 2 having two cylinder groups 10 and 20 including a first cylinder group 10 (a right bank) and a second cylinder group 20 (a left bank), two high-pressure stage superchargers 11 and 21 including a first high-pressure stage supercharger 11 and a second high-pressure stage supercharger 21, and two low-pressure stage superchargers 12 and 22 including a first low-pressure stage supercharger 12 and a second low-pressure stage supercharger 22 are provided. That is, the engine system 1 of the present embodiment includes four superchargers 11, 12, 21, and 22. A pressure of introduced air A is increased by the low-pressure stage superchargers 12 and 22 and the high-pressure stage superchargers 11 and 21.

The engine main body 2 can employ an engine that acquires a driving force by burning a gas mixture of a main fuel gas (a fuel gas) such as natural gas, city gas, or the like and air A, for example. The engine main body 2 is, for example, a V-type twelve-cylinder engine having twelve cylinders in total configured with the cylinder groups 10 and 20 each having 6 cylinders.

The first high-pressure stage supercharger 11 has a first high-pressure stage turbine 13 and a first high-pressure stage compressor 14 uniaxially connected to the first high-pressure stage turbine 13. That is, the first high-pressure stage compressor 14 and the first high-pressure stage turbine 13 are connected by a shaft member, and the first high-pressure stage compressor 14 is rotated by the driving of the first high-pressure stage turbine 13.

The second high-pressure stage supercharger 21 has a second high-pressure stage turbine 23 and a second high-pressure stage compressor 24 uniaxially connected to the second high-pressure stage turbine 23.

The first low-pressure stage supercharger 12 has a first low-pressure stage turbine 15 and a first low-pressure stage compressor 16 uniaxially connected to the first low-pressure stage turbine 15.

The second low-pressure stage supercharger 22 has a second low-pressure stage turbine 25 and a second low-pressure stage compressor 26 uniaxially connected to the second low-pressure stage turbine 25.

A first high-pressure stage exhaust pipe 17 serving as a pipe into which an exhaust gas E of the first cylinder group 10 is introduced is connected to the first high-pressure stage turbine 13 of the first high-pressure stage supercharger 11. The first high-pressure stage turbine 13 and the first low-pressure stage turbine 15 are connected by a first low-pressure stage exhaust pipe 18. That is, the first high-pressure stage turbine 13 and the first low-pressure stage turbine 15 are rotated by exhaust energies of the exhaust gases E discharged from the first cylinder group 10, and thus the first high-pressure stage compressor 14 connected to the first high-pressure stage turbine 13 and the first low-pressure stage compressor 16 connected to the first low-pressure stage turbine 15 rotate.

A second high-pressure stage exhaust pipe 27 serving as a pipe into which an exhaust gas E of the second cylinder group 20 is introduced is connected to the second high-pressure stage turbine 23 of the second high-pressure stage supercharger 21. The second high-pressure stage turbine 23 and the second low-pressure stage turbine 25 are connected by a second low-pressure stage exhaust pipe 28. That is, the second high-pressure stage turbine 23 and the second low-pressure stage turbine 25 are rotated by exhaust energy of the exhaust gas E discharged from the second cylinder group 20, and thus the second high-pressure stage compressor 24 and the second low-pressure stage compressor 26 rotate.

An air discharge port of the first low-pressure stage compressor 16 of the first low-pressure stage supercharger 12 is connected to an air inlet port of the second high-pressure stage compressor 24 of the second high-pressure stage supercharger 21 via a first crossing pipe 3. The compressed air A discharged from the first low-pressure stage compressor 16 is not introduced into the first high-pressure stage compressor 14 but is introduced into the second high-pressure stage compressor 24 via the first crossing pipe 3.

That is, the compressed air A compressed by the first low-pressure stage compressor 16 of the right bank (the first cylinder group 10) is compressed by the second high-pressure stage compressor 24 of the left bank (the second cylinder group 20) on a side opposite thereto.

The compressed air A discharged from the second high-pressure stage compressor 24 is supplied to the second cylinder group 20 via a second high-pressure stage air pipe 29.

An air discharge port of the second low-pressure stage compressor 26 of the second low-pressure stage supercharger 22 is connected to an air inlet port of the first high-pressure stage compressor 14 of the first high-pressure stage supercharger 11 via a second crossing pipe 4. That is, the compressed air A discharged from the second low-pressure stage compressor 26 is introduced into the first high-pressure stage compressor 14 and is then supplied to the first cylinder group 10 via a first high-pressure stage air pipe 19.

That is, the engine system 1 of the present embodiment includes a plurality of low-pressure stage superchargers 12 and 22 each having the low-pressure stage turbine 15 driven by the exhaust gas E discharged from the high-pressure stage turbine 13 of the high-pressure stage supercharger 11 which is any one of the plurality of high-pressure stage superchargers 11 and 21, and the low-pressure stage compressor 16 rotated by the driving of the low-pressure stage turbine 15 and configured to compress the compressed air A supplied to the high-pressure stage compressor 24 of a high-pressure stage supercharger 21 other than the one high-pressure stage supercharger 11.

Figure 2:
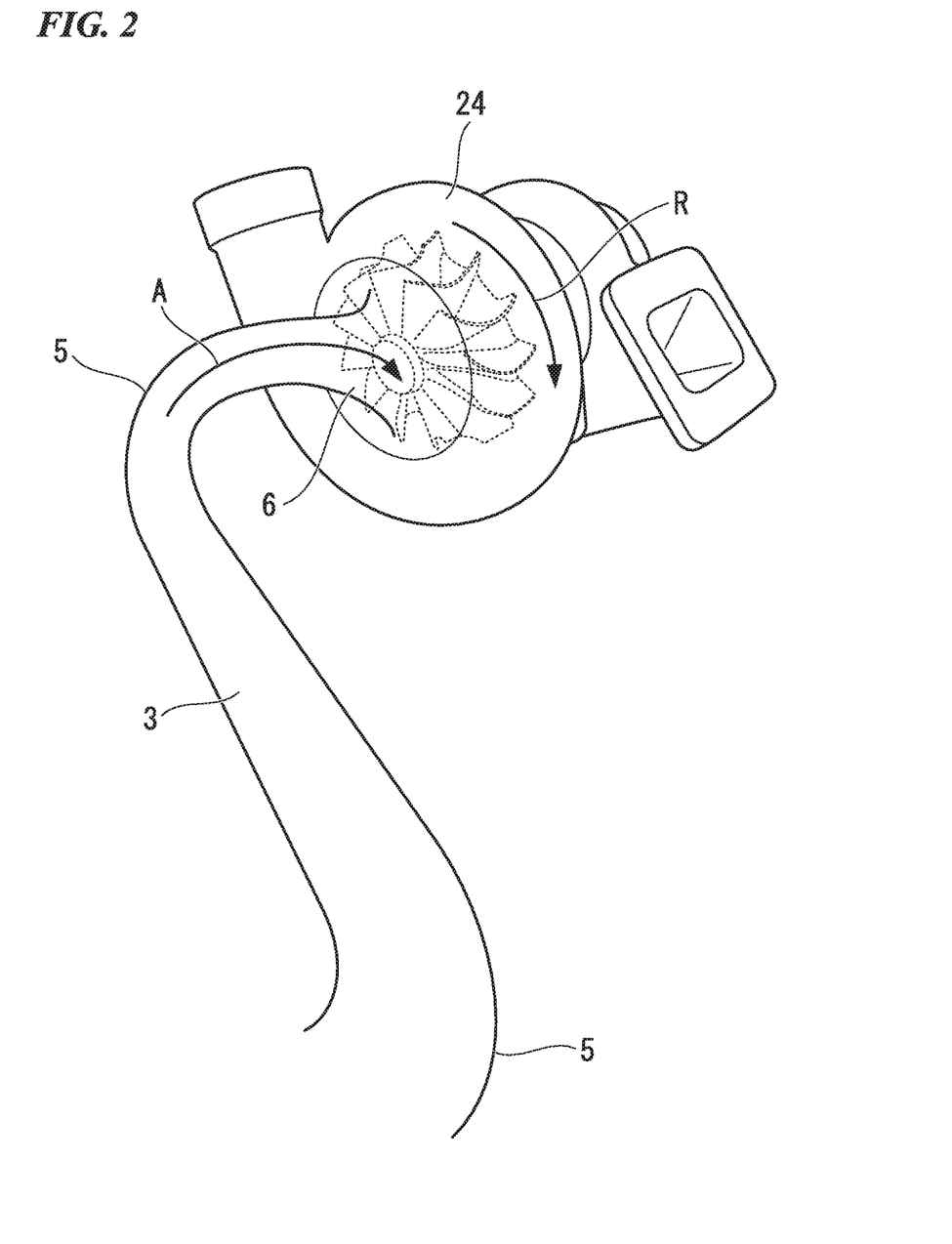
FIG. 2 is a perspective view of cross piping of an engine system according to an embodiment of the present invention.

When the first crossing pipe 3 and the second crossing pipe 4 are disposed as described above, the first crossing pipe 3 and the second crossing pipe 4 require bent portions. As illustrated in FIG. 2, for example, the first crossing pipe 3 includes a plurality of bent portions 5.

Figure 3:
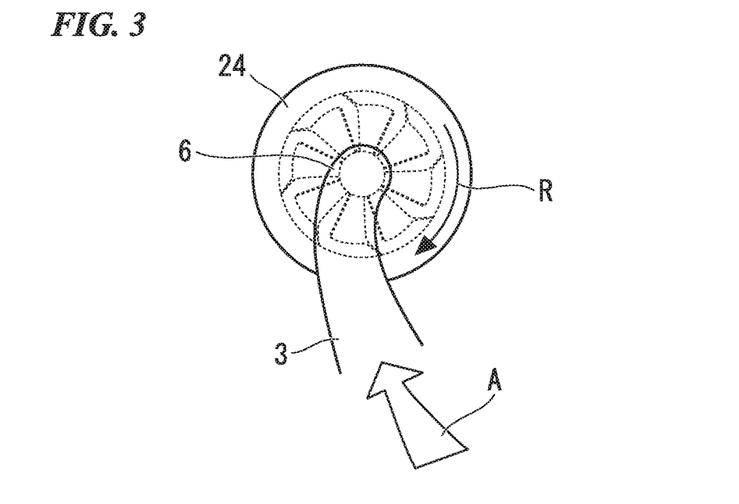
FIG. 3 is a front view of cross piping of an engine system according to an embodiment of the present invention.

As illustrated in FIGS. 2 and 3, a connecting portion 6 of the first crossing pipe 3 with respect to the second high-pressure stage compressor 24 is formed such that the compressed air A introduced into the second high-pressure stage compressor 24 swirls in a rotational direction R of an impeller of the second high-pressure stage compressor 24.

Specifically, the first crossing pipe 3 is formed so that an axial direction of the pipe in the connecting portion 6 is curved to follow the flow of the compressed air A flowing in the second high-pressure stage compressor 24. Thereby, a force is imparted to the compressed air A flowing in the first crossing pipe 3 such that a swirling motion is performed in a forward direction with respect to the rotational direction R of an impeller constituting the first high-pressure stage compressor 14.

Also, as in the first crossing pipe 3, a connecting portion of the second crossing pipe 4 with respect to the first high-pressure stage compressor 14 is formed such that the compressed air A introduced into the first high-pressure stage compressor 14 swirls in a rotational direction of an impeller of the first high-pressure stage compressor 14.

Next, an operational flow of the engine system 1 of the present embodiment will be described.

When temperatures and flow rates of the exhaust gas E discharged from the first cylinder group 10 and the exhaust gas E discharged from the second cylinder group 20 are substantially the same, a pressure ratio (a compression ratio) between the first high-pressure stage compressor 14 and the first low-pressure stage compressor 16 and a pressure ratio between the second high-pressure stage compressor 24 and the second low-pressure stage compressor 26 are substantially the same, and then pressures at an outlet of the first high-pressure stage compressor and an outlet of the second high-pressure stage compressor 24 are substantially the same. That is, the pressures of the compressed air A supplied to the first cylinder group 10 and the second cylinder group 20 of the engine main body 2 are increased to the same extent.

On the other hand, in some cases, the exhaust gas E discharged from the first cylinder group 10 reaches a high temperature and high flow rate and outputs of the first high-pressure stage turbine 13 and the first low-pressure stage turbine 15 continue to increase while the exhaust gas E discharged from the second cylinder group 20 becomes a low temperature and low flow rate and outputs of the second high-pressure stage turbine 23 and the second low-pressure stage turbine 25 decrease. Description will be made with reference to a supercharging efficiency map (a map illustrating how much rotational energy of the turbine can be converted to a pressure increase by the compressor) for the efficiency reduction in such a case.

Figure 4:
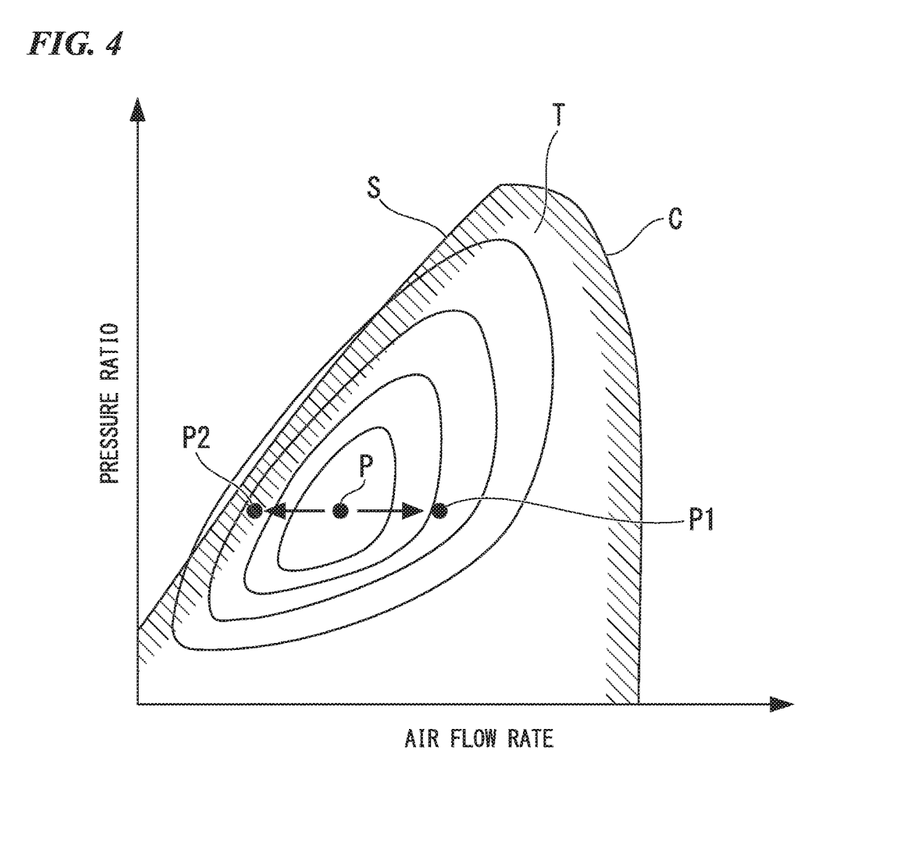
FIG. 4 is a view illustrating a supercharging efficiency map of a high-pressure stage supercharger according to an embodiment of the present invention.

FIG. 4 is a view illustrating a supercharging efficiency map of a high-pressure stage supercharger. The horizontal axis in FIG. 4 is an air flow rate. The vertical axis in FIG. 4 is a pressure ratio, that is, a ratio of the air pressure immediately after flowing out from a compressor to the air pressure immediately before flowing into the compressor. A plurality of annular lines are efficiencies obtained from the correlation between the air flow rate and the pressure ratio, and the efficiency becomes higher as the line is closer to the center. Line S is a surge line and line C is a choke line. A region T surrounded by the surge line S and the choke line C is the operation region of the compressor. A center point P of the plurality of annular lines is the most efficient operating point.

Figure 5:
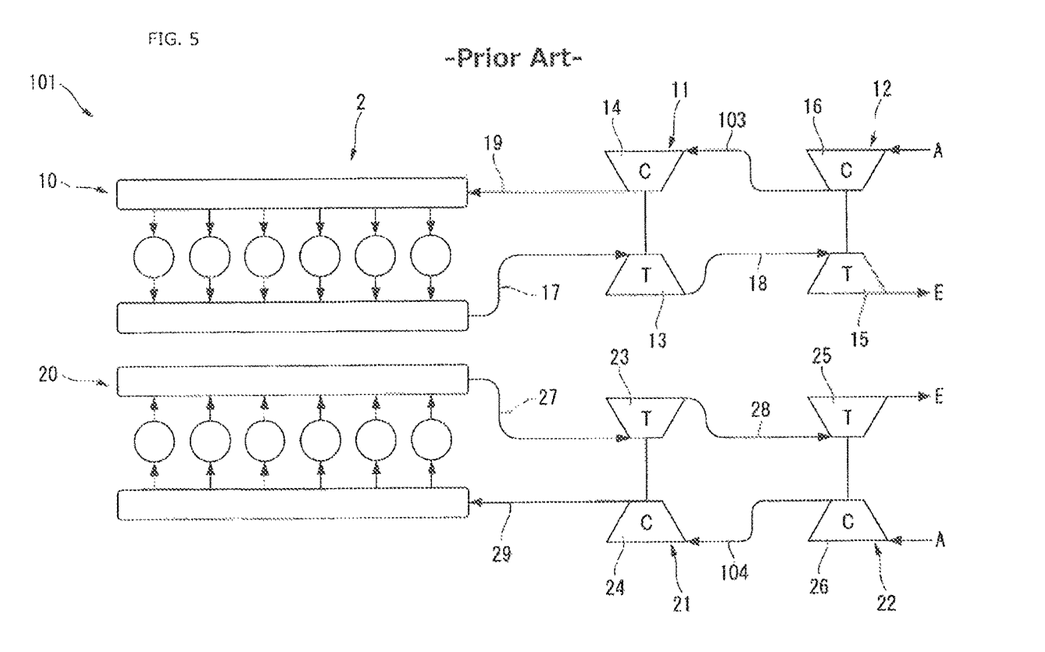
FIG. 5 is a view schematically illustrating a configuration example of a conventional engine system.

Here, as a conventional engine system 101 illustrated in FIG. 5, when a compressed air A discharged from a first low-pressure stage compressor 16 is introduced into a first high-pressure stage compressor 14 via a first low-pressure stage air pipe 103 and a compressed air A discharged from a second low-pressure stage compressor 26 is introduced into a second high-pressure stage compressor 24 via a second low-pressure stage air pipe 104, a large difference may occur in compression ratio of the compressed air A supplied to a first cylinder group 10 and a second cylinder group 20.

When an exhaust gas E with a high temperature and high flow rate is introduced into exhaust pipes 17 and 18 corresponding to the first cylinder group 10 (an excessive exhaust energy is supplied to the turbine), for example, an operating point of the first low-pressure stage compressor 16 moves to a P1 side. That is, the supercharger operates off the most efficient operating point P. While the compressed air A is introduced into the first high-pressure stage compressor 14 via the first low-pressure stage air pipe 103 and compressed, since the exhaust gas E introduced into a first high-pressure stage turbine 13 which drives the first high-pressure stage compressor 14 also has high temperature and high flow rate, degradation in efficiency is conceivable.

On the other hand, when an exhaust gas E with a low temperature and low flow rate is introduced into exhaust pipes 27 and 28 corresponding to the second cylinder group 20, an operating point of the second low-pressure stage compressor 26 moves to a P2 side. That is, it operates off the most efficient operating point. While the compressed air A is introduced into the second high-pressure stage compressor 24 via the second low-pressure stage air pipe 104 and compressed, since the exhaust gas E introduced into a second high-pressure stage turbine 23 which drives the second high-pressure stage compressor 24 also has low temperature and low flow rate, degradation in efficiency conceivable.

That is, in the piping configuration as illustrated in FIG. 5, when the exhaust energies of the exhaust gases E discharged from each of the cylinder groups 10 and 20 are different, there is a possibility that the efficiency may be degraded or the operation may exceed the surge line of the supercharger.

Also in the engine system 1 of the present embodiment, when a high temperature and high flow exhaust gas is introduced into the exhaust pipes 17 and 18 corresponding to the first cylinder group 10, a pressure of the compressed air A compressed by the first low-pressure stage compressor 16 increases and the operating point of the compressor moves to the P1 side. That is, it operates off the most efficient operating point.

On the other hand, when a low temperature and low flow rate exhaust gas is introduced into the exhaust pipes 27 and 28 corresponding to the second cylinder group 20, the operating point of the second low-pressure stage compressor 26 moves to the P2 side. That is, it operates off the most efficient operating point.

Here, the compressed air A discharged from the first low-pressure stage compressor 16 is introduced into the second high-pressure stage compressor 24 via the first crossing pipe 3. Also, the compressed air A discharged from the second low-pressure stage compressor 26 is introduced into the first high-pressure stage compressor 14 via the second crossing pipe 4.

In other words, the compressed air compressed by the first low-pressure stage compressor 16 of the right bank is compressed by the second high-pressure stage compressor 24 of the left bank and supplied to the engine. The compressed air A compressed by the second low-pressure stage compressor 26 of the left bank is compressed by the first high-pressure stage compressor 14 of the right bank and supplied to the engine.

The compressed air A compressed by the first low-pressure stage compressor 16 having a high output is supplied to the second high-pressure stage compressor 24 having a low output. The compressed air A compressed by the second low-pressure stage compressor 26 having a low output is supplied to the first high-pressure stage compressor 14 having a high output. Thereby, a balance between the left and right cylinder groups improves.

According to the above-described embodiment, even when the exhaust energies of the exhaust gases discharged from the left bank and the right bank are different, it is possible to make the air-intake flow rate and the pressure ratio between the cylinder groups close to being equal to each other.

Also, the connecting portions of the crossing pipes 3 and 4 with respect to the high-pressure stage compressor 14 and 24 are formed such that the compressed air A introduced into the high-pressure stage compressor 14 and 24 swirls in the rotational direction R of the high-pressure stage compressor 14 and 24. Thereby, since the rotational direction of the compressor matches the flowing direction of the compressed air A, it is possible to form a gas flow introduced into the compressor without increasing a pressure loss. As a result, it is possible to operate the compressor in a state in which the operation efficiency is high.

Although the embodiment of the present invention has been described in detail as above, various modifications can be made within the scope of the present invention without departing from the technical spirit of the present invention.

The number of cylinder groups is not limited to two, and the engine system 1 may have a configuration in which three or more cylinder groups are provided, for example.

INDUSTRIAL APPLICABILITY

According to the engine system described above, it is possible to make the air-supply flow rate and the pressure ratio between the cylinder groups close to being equal to each other even when exhaust energies of the exhaust gases discharged from a plurality of cylinder groups are different from each other.

REFERENCE SIGNS LIST

1 Engine system
2 Engine main body
3 First crossing pipe
4 Second crossing pipe
5 Bent portion
6 Connecting portion
10 First cylinder group
11 First high-pressure stage supercharger
12 First low-pressure stage supercharger
13 First high-pressure stage turbine
14 First high-pressure stage compressor
15 First low-pressure stage turbine
16 First low-pressure stage compressor
17 First high-pressure stage exhaust pipe
18 First low-pressure stage exhaust pipe
19 First high-pressure stage air pipe
20 Second cylinder group
21 Second high-pressure stage supercharger
22 Second low-pressure stage supercharger
23 Second high-pressure stage turbine
24 Second high-pressure stage compressor
25 Second low-pressure stage turbine
26 Second low-pressure stage compressor
27 Second high-pressure stage exhaust pipe
28 Second low-pressure stage exhaust pipe
29 Second high-pressure stage air pipe
A Compressed air
E Exhaust gas

The invention claimed is:

1. An engine system comprising:
a plurality of cylinder groups which burn a supplied gas mixture and discharge an exhaust gas;
a plurality of high-pressure stage superchargers each having a high-pressure stage turbine driven by the exhaust gas discharger from one of the cylinder groups corresponding thereto, and a high-pressure stage compressor rotated by driving of the high-pressure stage turbine and configured to compress a gas to be supplied to the corresponding cylinder group; and
a plurality of low-pressure stage superchargers each having a low-pressure stage turbine driven by an exhaust gas discharged from the high-pressure stage turbine of any one high-pressure stage supercharger of the plurality of high-pressure stage superchargers and a low-pressure stage compressor rotated by driving of the low-pressure stage turbine and configured to compress a gas to be supplied to a high-pressure stage compressor of a high-pressure stage supercharger other than the one high-pressure stage supercharger,
wherein a pipe installed between the low-pressure stage compressor and the high-pressure stage compressor includes a bent portion which is turned so as to be oriented in a direction of a rotation shaft of the high-pressure stage compressor, and the bent portion is connected to the high-pressure stage compressor via a connection portion,
wherein the bent portion is curved so that an axial direction of the pipe in the connecting portion of the pipe and the high-pressure stage compressor follows a flow of the gas flowing in the high-pressure stage compressor, thereby a force is imparted to a gas to be introduced to the high-pressure stage compressor such that a swirling motion is performed in a forward direction with respect to the rotational direction of an impeller included in the high-pressure stage compressor.

2. An engine system comprising:
a first cylinder group and a second cylinder group which each burns a supplied gas mixture and discharge an exhaust gas;
a first high-pressure stage supercharger having a first high-pressure stage turbine driven by the exhaust gas discharged from the first cylinder group and a first high-pressure stage compressor rotated by driving of the first high-pressure stage turbine and configured to compress a gas to be supplied to the first cylinder group;
a second high-pressure stage supercharger having a second high-pressure stage turbine driven by the exhaust gas discharged from the second cylinder group and a second high-pressure stage compressor rotated by driving of the second high-pressure stage turbine and configured to compress a gas to be supplied to the second cylinder group;
a first low-pressure stage supercharger having a first low-pressure stage turbine driven by an exhaust gas discharged from the first high-pressure stage turbine of the first high-pressure stage supercharger and a first low-pressure stage compressor rotated by driving of the first low-pressure stage turbine and configured to compress a gas to be supplied to the second high-pressure stage compressor of the second high-pressure stage supercharger; and a second low-pressure stage supercharger having a second low-pressure stage turbine driven by an exhaust gas discharged from the second high-pressure stage turbine of the second high-pressure stage supercharger and a second low-pressure stage compressor rotated by driving of the second low-pressure stage turbine and configured to compress a gas to be supplied to the first high-pressure stage compressor of the first high-pressure stage supercharger, wherein a first crossing pipe installed between the first low-pressure stage compressor and the second high-pressure stage compressor includes a bent portion which is turned so as to be oriented in a direction of a first rotation shaft of the second high-pressure stage compressor, and the bent portion is connected to the second high-pressure stage compressor via a connection via a first connection portion, wherein the first bent portion is curved so that an axial direction of the first crossing pipe in the first connecting portion of the first crossing pipe and the second high-pressure stage compressor follows a flow of the gas flowing in the second high-pressure stage compressor, thereby a first force is imparted to a gas to be introduced to the second high-pressure stage compressor such that a swirling motion is performed in a forward direction with respect to the rotational direction of an impeller included in the second high-pressure stage compressor, and a second crossing pipe installed between the second low-pressure stage compressor and the first high-pressure stage compressor includes a second bent portion which is turned so as to be oriented in a direction of a second rotation shaft of the first high-pressure stage compressor, and the bent portion is connected to the first high-pressure stage compressor via a second connection portion, wherein the second bent portion is curved so that an axial direction of the second crossing pipe in the second connecting portion of the second crossing pipe and the first high-pressure stage compressor follows a flow of the gas flowing in the first high-pressure stage compressor, thereby a second force is imparted to a gas to be introduced to the first high-pressure stage compressor such that a swirling motion is performed in a forward direction with respect to the rotational direction of an impeller included in the first high-pressure stage compressor.

* * * * *